United States Patent [19]

Mountz et al.

[11] Patent Number: 4,952,009
[45] Date of Patent: Aug. 28, 1990

[54] CURTAINED DOORS FOR VEHICLE BODIES

[75] Inventors: Elton E. Mountz; Paul L. Whiteman, both of Morgantown, Pa.

[73] Assignee: Morgan Corporation, Morgantown, Pa.

[21] Appl. No.: 68,179

[22] Filed: Jun. 29, 1987

[51] Int. Cl.$^5$ .............................................. B60J 5/06
[52] U.S. Cl. ..................................... 296/181; 296/183
[58] Field of Search ................ 296/181, 183; 160/345, 160/346, 84.1

[56] References Cited

U.S. PATENT DOCUMENTS

| | | | |
|---|---|---|---|
| 3,016,951 | 1/1962 | Greene | 160/346 |
| 3,709,552 | 1/1973 | Broadbent | 296/183 |
| 4,545,611 | 10/1985 | Broadbent | 296/181 |
| 4,595,231 | 6/1986 | Bennett et al. | 296/181 |
| 4,700,985 | 10/1987 | Whitehead | 296/181 |

FOREIGN PATENT DOCUMENTS 595829 7/1925 France .
2174136 10/1986 United Kingdom .

Primary Examiner—Robert R. Song
Attorney, Agent, or Firm—Elliot M. Olstein; Raymond J. Lillie

[57] ABSTRACT

A vertical tensioning means and a horizontal tensioning means for a curtained door of a van body. The vertical tensioning means comprises at least one set of rollers which are rollably movable in each of upper and lower tracks located opposite the top and bottom of the van body. The vertical tensioning means also includes adjustable straps which communicate with upper and lower brackets which hold the rollers.

The horizontal tensioning means comprises an end plate which includes a cam keeper portion capable of being engaged by a cam. The curtain of the door is bossed against the end plate. Horizontal tensioning of the curtain is provided when the cam engages the end plate.

18 Claims, 8 Drawing Sheets

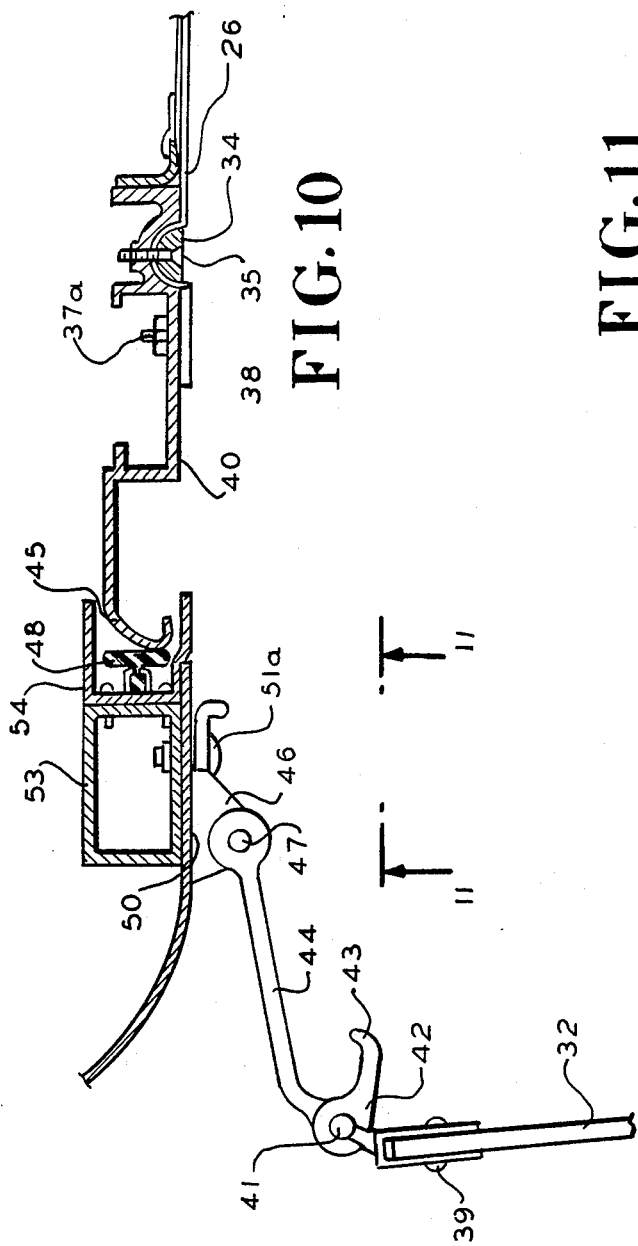
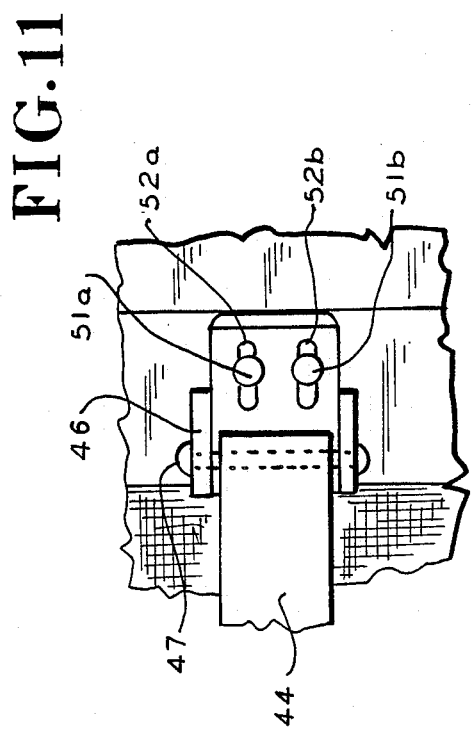
FIG.10
FIG.11

FIG. 8
FIG. 7
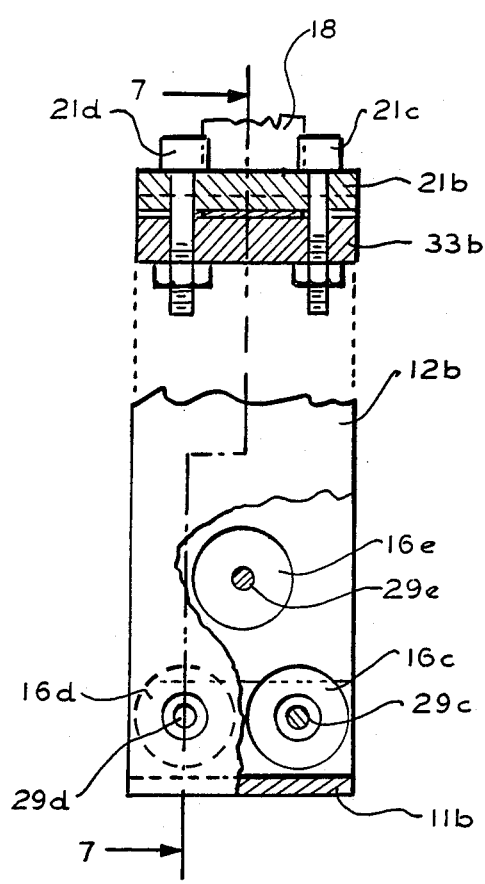
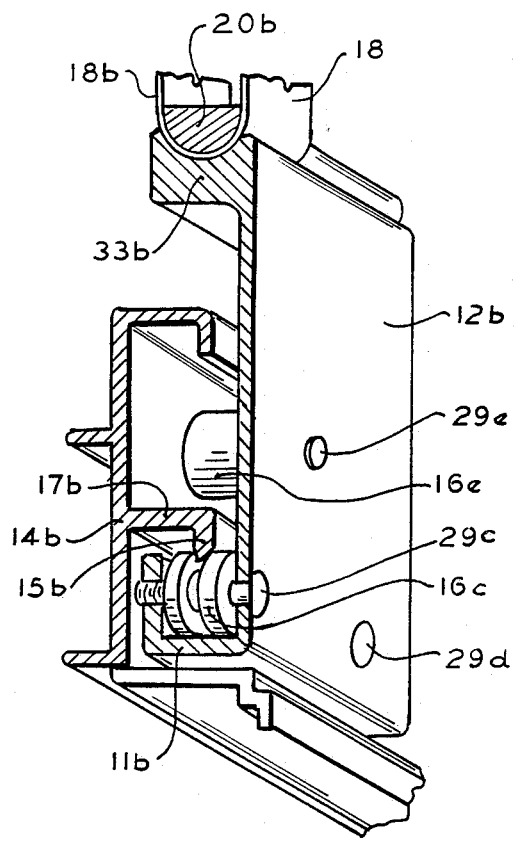

CURTAINED DOORS FOR VEHICLE BODIES

This invention relates to tensioning mechanisms for doors which are in the form of a curtain. More particularly, this application relates to mechanisms or means for providing vertical tensioning and means for providing horizontal tensioning for curtained doors which are located on the side of a vehicle body, most preferably for a van body.

Curtained doors and various means for tensioning curtained doors are known in the art. Examples of van bodies that have curtained doors are disclosed in U.S. Pat. Nos. 3,709,552 and 4,545,611. The term "van body" is defined as the trailer portion of an articulated road vehicle, the body portion of a non-articulated road vehicle, a railroad car, or any body which supports cargo and has a roof which is disposed at the top of the body. One vertical tensioning mechanism, as disclosed in U.S. Pat. No. 3,709,552, comprises a bar curtained door attached to traveling means which fit inside a track. A strap, which can be adjusted, communicates with the top of the curtained door and also communicates with the bottom of the vehicle body by means of a hook attached to the bottom of the strap. The strap otherwise is unattached to the curtained door. The hook fits into a track located at the bottom of the truck body. The tension in the strap, as may be adjusted by means of buckles located in the strap. The horizontal tensioning is provided by a spool located at an end of the truck body. The winding of the curtain around the spool provides for the horizontal tensioning of the curtain. In order to open this door, however, one not only releases the horizontal tension, but also must remove the hook from its track at the bottom of the truck body, thereby releasing the vertical tensioning as well. Another van body, as disclosed in U.S. Pat. No. 4,545,611, has an upper runner and a lower hook which are located at the top and at the bottom, respectively, of a curtained door of the van body. Panels in the curtain are defined by rigid members housed in vertical sleeves. Horizontal tensioning is provided by an over-the-top latching mechanism.

It can be seen that the above-described mechanisms provide vertical and horizontal tensioning. The vertical tensioning provided by the above-described mechanisms, however, may sometimes be inadequate, thus allowing the interior of the vehicle body to be affected to various degrees of rain, snow, heat, cold and other external elements. Also, the provision of inadequate tension in the curtained door could result in damage to the curtained door if the vehicle experiences adverse road conditions. The tensioning mechanisms that were mentioned above could become disengaged from the vehicle body if bumps or other adverse conditions are encountered. Some van bodies, as mentioned above, require the releasing of both the horizontal and vertical tensioning when the door is opened. It is therefore an object of the present invention to provide an improved van body which includes tensioning mechanisms for curtained doors which will provide adequate tension for the doors so as to protect the interior of the vehicle from the adverse elements and also to provide greater stability to the curtained doors as well as providing for easier movement of the curtained doors when the doors are opened.

In accordance with an aspect of the present invention there is provided a van body having a portion thereof closed by a curtain. The body is provided with a pair of roller tracks, with an upper track being located opposite the top of the body, and a lower roller track being located opposite the bottom of the body. An upper set of roller means is rollably fitted in the upper track, and a lower set of roller means is positioned in the lower tracks. An upper bracket means is attached to said upper set of rollers and a lower bracket means is attached to said lower set of rollers, each of said bracket means corresponding to one of said roller tracks, and tensioning means for applying vertical tension to the upper bracket and the lower bracket to maintain thereby the upper and lower roller means in the respective tracks. In accordance with a preferred embodiment, the curtain is provided with a plurality of spaced vertical reinforcing webs or strips which preferably are an integral part of the curtain, with such vertical strips being attached to the upper and lower brackets whereby the curtain may be vertically tensioned in conjunction with vertical tensioning of the upper and lower brackets. The webs or strips are attached to the upper and lower brackets by means of an upper strap and a lower strap, each strap extending from the upper portion of the web or the lower portion of the web, and each strap being connected to the upper bracket or the lower bracket. Each strap also includes a free end. Each strap may be attached to the upper bracket or to the lower bracket by an upper or a lower bossing means, preferably in the form of a half round, and means for connecting said upper or lower bossing means to said upper or lower bracket. The tracks may also further include a rail for said rollers, with the rail of the upper track being located under the upper rollers, and the rail of the lower track being located above the lower rollers. The upper and lower rollers are movable along said rails of said upper and lower tracks. At least one of the brackets may further comprise a biasing means. The means for adjusting the tension of said straps may comprise a buckle. The biasing means for each of said retaining brackets may comprise a bolting means inserted in at least one of said retaining brackets, and a spring means surrounding each of said bolting means. The vertical tensioning means may further comprise a pocket means for containing said straps, said pocket means being attached to said curtained door and being located between said upper bracket and said lower bracket.

The means for providing horizontal tensioning for a curtained door of a vehicle or van body, said curtained door including a curtain, comprises at least one end plate located at an end of said curtain, means for attaching said curtain against said end plate, and latching means for holding said curtain against a vehicle body, said latching means including a camming means, said camming means being engageable and disengageable with said end plate, whereby horizontal tensioning is applied to said curtain by engaging said camming means with said end plate. The attaching means may comprise a half round, said half round being adjacent to said curtain portion for the entire length of the arc of said half round, and means for mounting said half round and said curtain portion against said end plate. The latching means may further comprise a handle, means for detachably securing said handle to said end plate, a first pivot for pivotally attaching said camming means to said handle, said camming means being engageable and disengageable with a cam keeper portion of said end plate and said vehicle body, and said camming means also being rotatable about a second pivot, at least one hinge bar, said at least one hinge bar being located adjacent one end of said camming means and also rotatable about said second pivot, and at least one hinge butt means, said at least one hinge butt means being attached to said vehicle body and attached to at least one of said hinge bars by a third pivot. Preferably, the camming means is of the same height as the height of the end plate, thus making the cam continuously engageable and disengageable along the entire height of the end plate. In addition, the hinge butt means preferably is slidable along the vehicle body so as to position the cam for proper engagement and disengagement with the cam keeper portion of the end plate. The hinge butt preferably is slidably mounted on the vehicle body by at least one mounting means inserted into at least one elongated opening in said hinge butt. The elongated opening has a width greater than the diameter of the mounting means, and a height substantially the same as the diameter of the mounting means. The ability to slide the hinge butt along the vehicle body enables one to position the latching portion in a way such that the camming means will be able to engage the cam keeper portion of the end plate so that the proper degree of horizontal tensioning for the curtained door will be maintained. Also in a preferred embodiment, the handle comprises a first portion and a second portion, said first portion being pivotally connected to said second portion by a fourth pivot and rotatable by 180° about said fourth pivot. In this embodiment, the second portion of the handle is preferably the portion that is detachably connected to the end plate.

FIG. 7 is a side cross-sectional view of a lower roller bracket, lower roller track, and set of rollers of the vertical tensioning means;

FIG. 8 is a partial cut-away view of the lower bracket shown in FIG. 7;

FIG. 10 is a top cross-sectional view of the horizontal tensioning means in the disengaged position; and FIG. 11 is a front view of a hinge butt of the horizontal tensioning means, said hinge butt being attached to a vehicle body.

Figure 1:
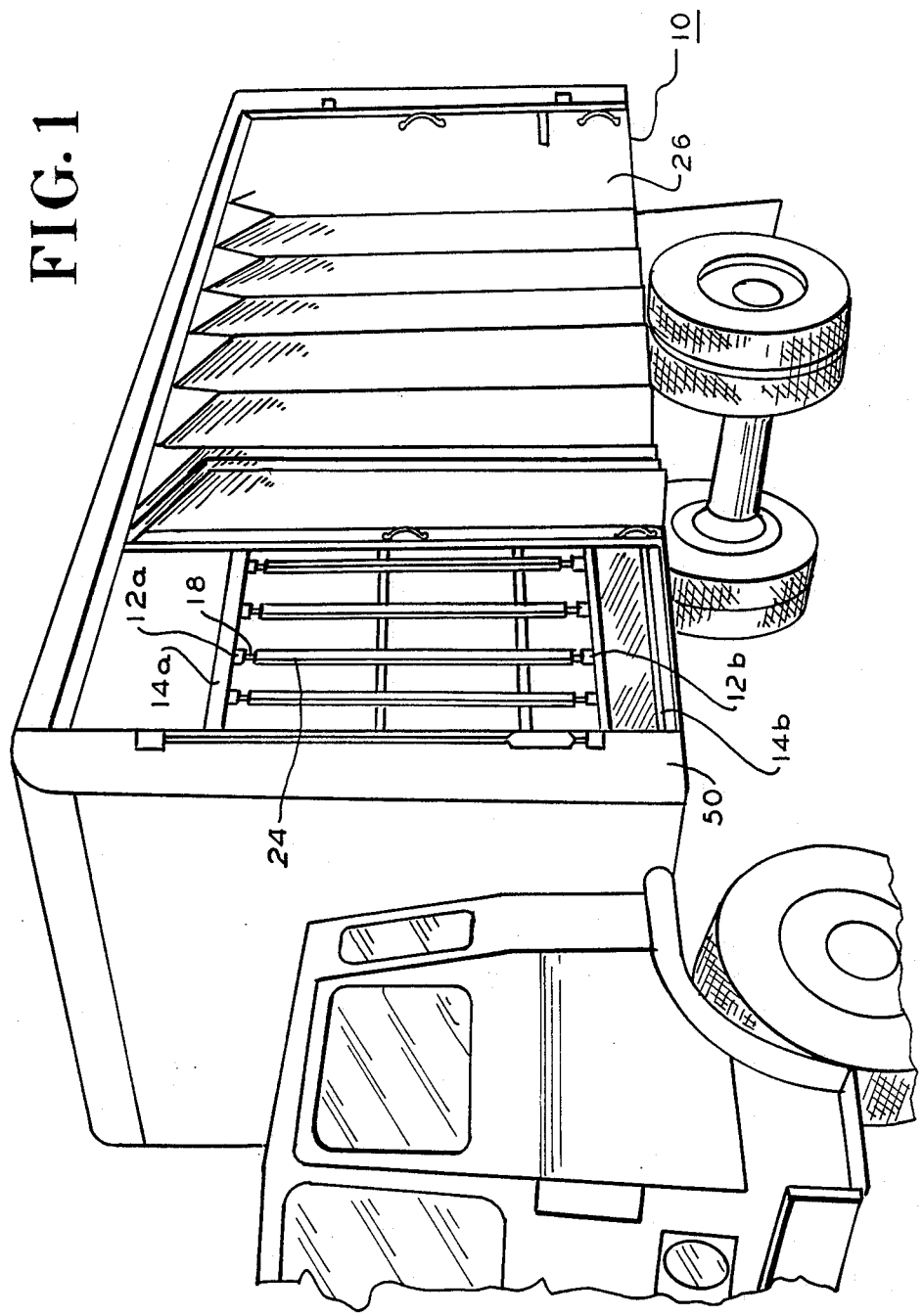
FIG. 1 is a side view of a curtained door an embodiment of the vertical tensioning means of the present invention.
Figure 2:
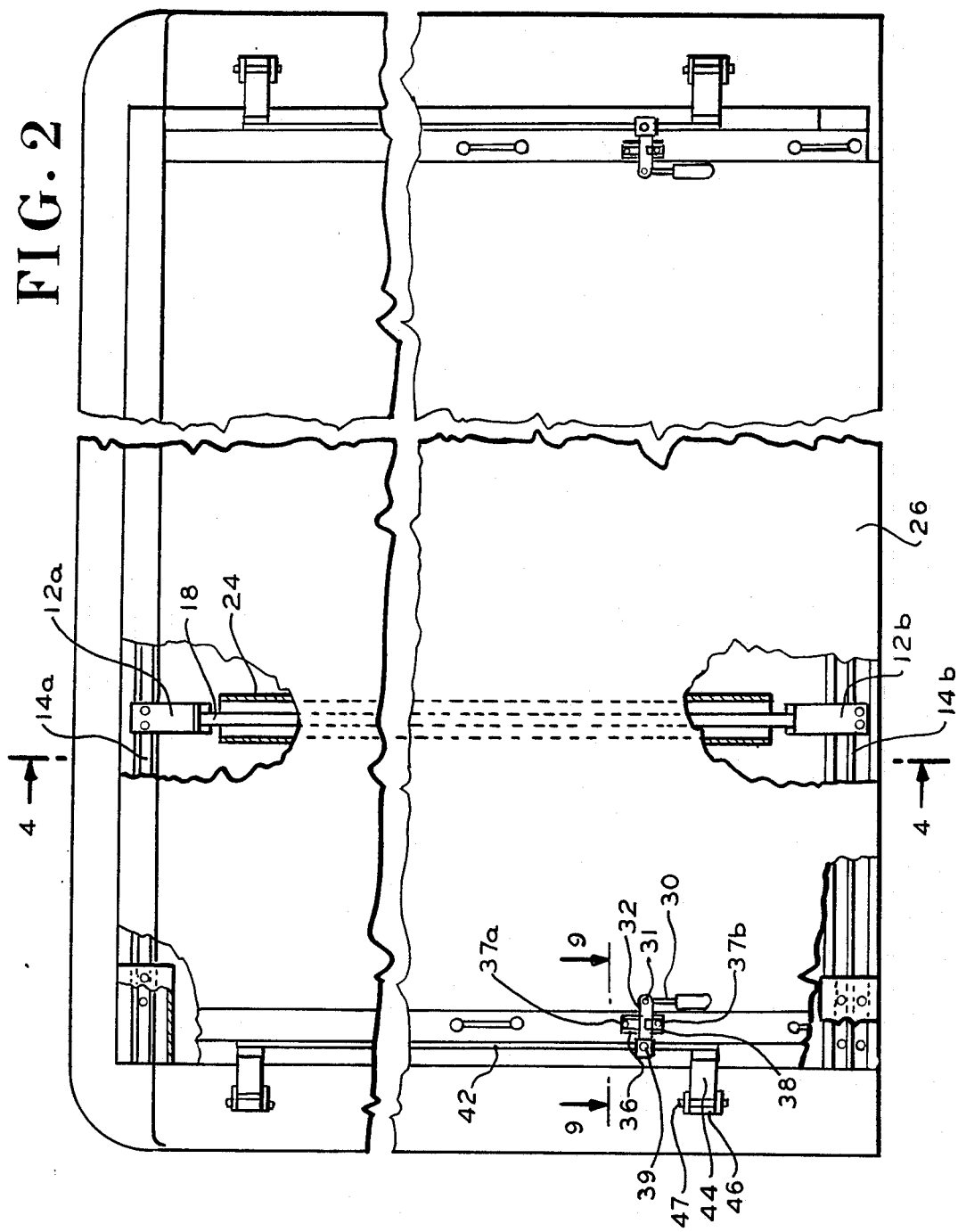
FIG. 2 is a partial cut-away side view of an embodiment of the vertical tensioning means of the present invention and a side view of an embodiment of the horizontal tensioning means of the present invention.
Figure 3:
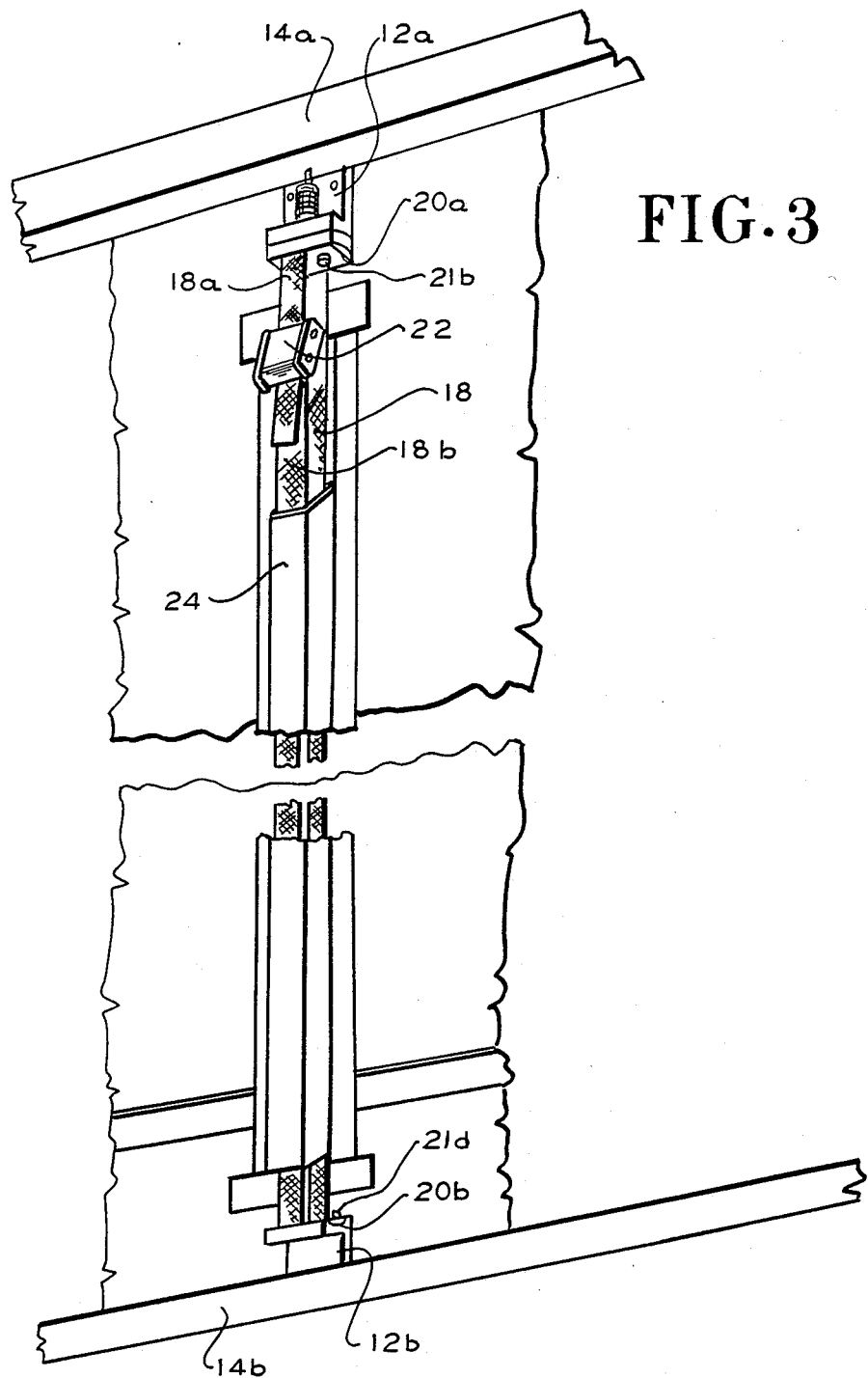
FIG. 3 is a break-away side view of an embodiment of the vertical tensioning means of the present invention.
Figure 4:
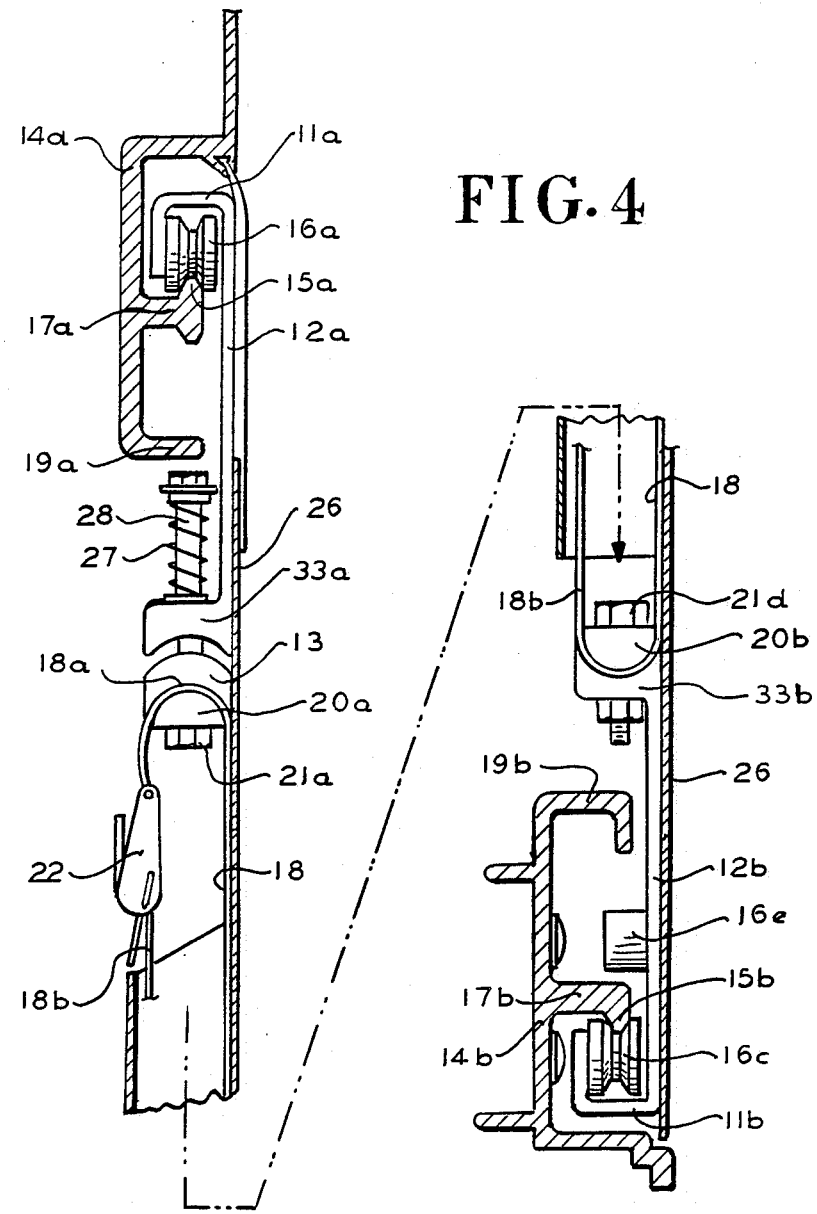
FIG. 4 is a side cross-sectional view of the vertical tensioning means.
Figure 5:
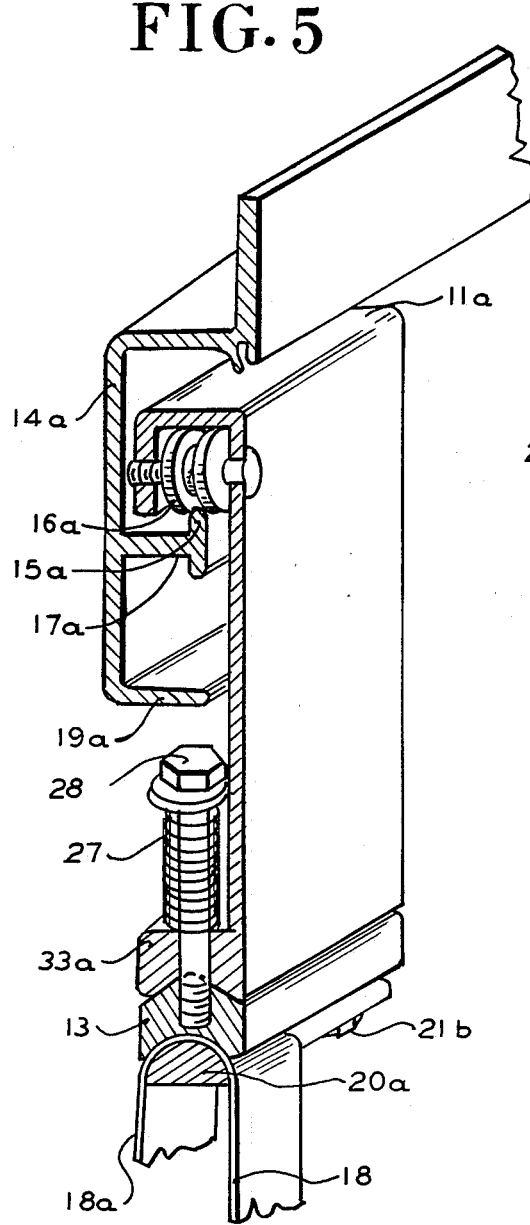
FIG. 5 is a side cross-sectional view of an upper bracket, an upper roller track and a roller of the vertical tensioning means.
Figure 6:
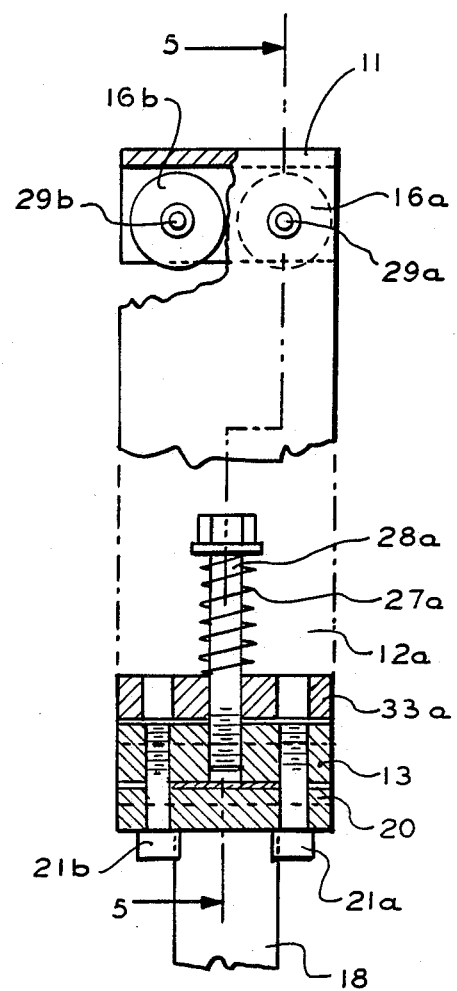
FIG. 6 is a partial cut-away side view of the roller bracket and roller set shown in FIG. 5.

Referring now to the drawings, the vertical tensioning means of the present invention for the curtained door 10 comprises an upper retaining bracket 12a, which corresponds to upper roller track 14a and a lower retaining bracket 12b, which corresponds to lower roller track 14b. Rollers 16a and 16b are contained within hook 11a of upper bracket 12a, and are attached to upper bracket 12a by bolts 29a and 29b. Rollers 16c and 16d are contained within hook 11b of lower bracket 12b, and are attached to lower bracket 12b by bolts 29c and 29d. It can also be seen that hook 11a of bracket 12a, as well as rollers 16a and 16b, fit within roller track 14a. Extending toward bracket 12a from the roller tracks 14a is plate 17a which terminates in rail 15a. Rollers 16a and 16b are located above rail 15a and are rollably movable along rail 15a of roller track 14a. Hook 11b of roller bracket 12b, as well as rollers 16c and 16d, fit within roller track 14b. Extending from roller track 14b toward roller bracket 12b is plate 17b, which terminates in rail 15b. Rollers 16c and 16d are located below rail 15b and are rollably movable along rail 15b. Optionally, roller 16e, attached to lower bracket 12b by bolt 29b, may slide or ride along rail 15b, opposite rollers 16c and 16d. Upper roller bracket 12a and lower roller bracket 12b, however, are not directly attached to the curtain portion 26 of curtained door 10.

Mounted on upper bracket 12a is a biasing means comprising of a bolt 28, and a spring 27 surrounding bolt 28. Bolt 28 is inserted into flange 33a of upper bracket 12a. It can also be seen that the head of bolt 28 is opposite flange 19a of roller track 14a. Thus, if the vehicle experiences adverse road conditions, the head of bolt 28 may hit against flange 19a of roller track 14a. Thus, if the vehicle experiences adverse road conditions, bolt 28 may hit against flange 19a and compress spring 27. In this way, bolt 28 and spring 27 act as a shock absorber for the curtained door 10 and help keep rollers 16a and 16b in place on rail 15a. In a preferred embodiment, plate 13 of upper bracket 12a may be located under flange 33a of upper bracket 12a and also be capable of receiving bolt 28.

Communicating with both upper bracket 12a and lower bracket 12b is web 18. Web 18 is attached to curtain 26 of curtained door 10. Web 18 has extending from it an upper strap 18a from the upper portion of web 18 and a lower strap 18b from the lower portion of web 18. Strap 18a is bossed against plate 13 or against flange 33a of upper bracket 12a by half round 20a. Bolts 21a, 21b are inserted into half round 20a on both sides of strap 18a, and are also inserted into plate 13. Strap 18b is bossed against flange 33b of lower bracket 12b by half round 20b. Bolts 21c and 21d are inserted into half round 20b on both sides of strap 18b and also into flange 33b of lower bracket 12b. Strap 18a passes between half round 20 and plate 13 or flange 33a of upper bracket 12a, and downwardly into and through buckle 22. Strap 18b runs upwardly from lower bracket 12b and is inserted into buckle 22. The tension of straps 18a and 18b can be adjusted by passing various lengths of straps 18a and 18b through buckle 22. A preferred embodiment of buckle 22 is a buckle made by Ancra Co. and covered under U.S. Pat. No. 3,678,542. By adjusting the amount of strap 18a which passes through buckle 22, one is applying vertical tension to curtain 26 of the curtained door 10, and to upper bracket 12a and lower bracket 12b by virtue of the web 18 being attached to the curtain 26. Web 18 may be attached to curtain 26 by any means known in the art such as by welding web 18 to curtain 26, thereby making web 18 an integral portion of curtain 26.

In addition to providing vertical tension for curtain 26, by tightening buckle 22 of straps 18a and 18b, one also keeps rollers 16a and 16b firmly pressed against rail 15a, and keeps rollers 16c and 16d firmly pressed against rail 15b. This is due to the tension and pulling action of web 18 and straps 18a and 18b on roller brackets 12a and 12b.

In a preferred embodiment, straps 18a and 18b, as well as web 18 are contained within pocket 24. This pocket 24 is attached to curtain 26 of curtained door 10 by any means known in the art, such as by stitching or welding pocket 24 to curtain 26. Although one arrangement of upper and lower roller tracks, upper and lower roller brackets, upper and lower sets of rollers, a web, and straps has been described, it can be seen from the drawing that a plurality of these arrangements is needed in order to maintain the proper vertical tensioning of the curtain 26 and of the curtained door 10. The arrangement which has been described above is advantageous in that the rollers provide for easier movement of the curtain when opening the door. In addition, the rollers are mounted securely on the brackets and fit securely on the rails so that the rollers are not likely to be removed from the rails or the roller tracks when adverse road conditions are encountered.

Figure 9:
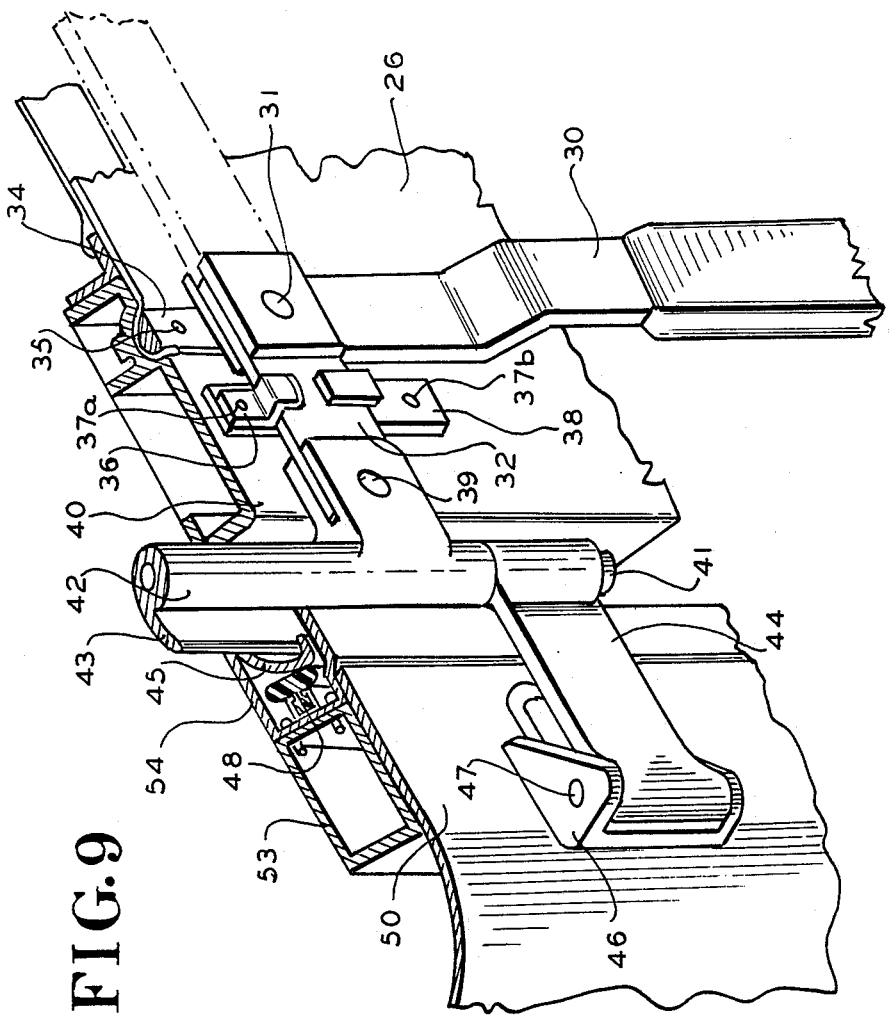
FIG. 9 is a side elevational view of an embodiment of the horizontal tensioning means of the present invention in the engaged position.

The horizontal tensioning means for the curtained doors 10 is depicted in FIGS. 9 and 10. This tensioning means comprises at least one end plate 40 which is located adjacent a front or rear corner of the vehicle body 50 when the horizontal tensioning means is in an engaged position as in FIG. 9. The curtain 26 of curtained door 10 is bossed against end plate 40 by half round 34. A series of mounting means, such as bolt 35, which is inserted through half round 34, curtain 26, and into end plate 40 keeps the curtain 26 bossed against end plate 40. It can also be seen that half round 34 is adjacent to curtain 26 for the entire length of the arc of half round 34.

At one end of end plate 40 is a cam keeper 45. The cam keeper 45 is capable of receiving flange 43 extending from a camming means 42. Flange 43 rests in cam keeper 45 when the horizontal tensioning means is in an engaged position. Cam keeper 45 abuts against rubber stop 48, which is attached to a retainer 54 which is adjacent to vehicle body 50. Also adjacent to vehicle body 50 is a rectangular tubular support 53.

The horizontal tensioning means also includes a latching mechanism. In a preferred embodiment, the latching mechanism comprises a handle including portions 30 and 32 which are connected by pivot 31. Handle 30 is capable of being pivoted 180° about pivot 31. Portion 32 of the handle rests in bracket 38, which is attached to end plate 40 by bolts 37a and 37b. Mounted on bracket 38 is bracket 36 for detachably securing handle portion 32 to end plate 40. Bracket 36 is pivotable around pivot 37a. Handle portion 32 is connected to cam 42 by pivot 39. Cam 42 surrounds pivot 41 and has a flange 43 extending from cam 42 which is capable of being engaged with cam keeper 45 of end plate 40. Cam 42 and flange 43 of cam 42 are of substantially the same height as the height of cam keeper 45 of end plate 40. In this way, flange 43 of cam 42 is capable of being put in continuous engagement with cam keeper 45 of end plate 40. Also in pivotal relationship with pivot 41 is hinge bar 44, located as shown in FIG. 9, under cam 42. Another hinge bar may also be located above cam 42 if desired. Hinge bar 44 is also pivotally connected to hinge butt 46 by means of pivot 47. Hinge butt 46 is mounted against vehicle body 50 by bolts 51a and 51b, which are inserted into elongated openings 52a and 52b. Bolts 51a and 51b are thereby inserted through a side of vehicle body 50 as well as through a side of rectangular tubular support 53. The length of elongated openings 52a and 52b are greater than the diameter of bolts 51a and 51b. The height of elongated openings 52a and 52b is substantially the same as the diameter of bolts 51a and 51b. Horizontal tensioning of the curtained door 10 is maintained when the horizontal tensioning means is in an engaged position, i.e., when the curtained door 10 is closed. In order to disengage the horizontal tensioning means, one rotates bracket 36 around pivot 37a so that bracket 36 no longer obstructs handle portion 32. One then lifts handle portion 32 out of bracket 38 by gripping and lifting on handle portion 30 thereby rotating handle portion 32 about pivot 39. Once handle portion 32 is lifted out of bracket 38, one can then use handle portions 30 and 32 to rotate cam 42 about pivot 41, and thereby disengage flange 43 from cam keeper 45. Once the flange 43 is disengaged, one can then move the cam 42 and the handle portions 30 and 32 away from end plate 40 by rotating hinge bar 44 about pivot 47 and resting the latching means against vehicle body 40. Then one can open the curtained door 10 by grabbing and pushing on end plate 40 so as to compress curtain 26. The horizontal tensioning means just described may be placed on a curtained door in conjunction with the vertical tensioning means described in this application or in conjunction with any other vertical tensioning means known in the art. An advantage of this horizontal tensioning means is that when one releases the horizontal tensioning means, the vertical tensioning as defined by the rollers, roller tracks, rails, roller brackets, webs, straps, and buckles described above, is still maintained in the curtain. One therefore does not have to diengage the vertical tensioning means in order to open the curtained door.

It can also be seen that the hinge butt 46 is slidable along vehicle body 50 by virtue of bolts 51a and 51b being inserted in elongated openings 52a and 52b. This allows one to adjust the latching means of the horizontal tensioning means so that flange 43 of cam 42 will engage cam keeper 45 of end plate 40 so that the proper degree of horizontal tensioning will be maintained. The latching means may require occasional adjustments in position on the truck body 50 due to slight expansion or contraction of curtain 26 of curtained door 10 due to various external conditions such as moisture, heat, or cold. Adjusting the latching means by moving hinge butt 46 along vehicle body 50 by moving openings 52a and 52b of hinge butt 46 along bolts 51a and 51b enables one to make the most secure fit possible of flange 43 of cam 42 into cam keeper 45 of end plate 40, thereby providing the optimum degree of horizontal tensioning of curtained door 10.

Another advantage of the horizontal tensioning means described above is that the handle, in the preferred embodiment, is in two portions 30 and 32. Portion 30 is movable about pivot 31 and can be moved to a vetical position. In this position, the handle portion 30 is less likely to interfere with curtain 26 as the curtain 26 is being compressed during opening of curtained door 10.

In order to provide horizontal tensioning, one merely returns end plate 40 to its original position, where cam keeper 45 abuts against rubber stop 48. Then one grips handle portion 30 to rotate the entire latching mechanism so that flange 43 of cam 42 engages cam keeper 45 and places handle portion 32 back into bracket 38 and places bracket 36 back over handle portion 32. Horizontal tension is therefore provided only when the horizontal tensioning means is in an engaged position. Disengaging the horizontal tensioning means results in releasing the horizontal tensioning. Although only one horizontal tensioning means has been described, said means being located at one end of a curtained door, another corresponding horizontal tensioning means of the same construction as described above may be located at the opposite end of the curtained door. In this case, disengagement of just one of the horizontal tensioning means will result in a release of horizontal tensioning of the entire curtained door. Both horizontal tensioning means must be in an engaged position in order for horizontal tensioning to be maintained.

An advantage of the horizontal and vertical tensioning means is that when one releases the horizontal tensioning means, the vertical tensioning as defined by the rollers, roller tracks, rails, roller brackets, webs, straps, and buckles described above, is still maintained on the curtain and rollers. One therefore does not have to disengage the vertical tensioning means in order to open the curtained door.

It is to be understood, however, that the scope of the present invention is not to be limited to the specific embodiments described above. The invention may be practiced other than as particularly described and still be within the scope of the accompanying claims.

What is claimed is:

1. A van body comprising:
   a curtain;
   an upper track opposite the top of said van body;
   an upper set of roller means rollably fitted in said upper track;
   a lower track opposite the bottom of said van body;
   a lower set of roller means rollably fitted in said lower track;
   an upper bracket means attached to said upper set of roller means;
   a lower bracket means attached to said lower set of roller means;
   a first means for attaching said curtain to said upper bracket means;
   a second means for attaching said curtain to said lower bracket means;
   a plurality of spaced vertical reinforcing webs, said curtain being connected to the upper bracket means at said reinforcing web and said curtain being connected to the lower bracket means at said reinforcing web, and wherein said means for attaching the curtain to the upper bracket means is comprised of an upper strap portion extending from the upper portion of the web and being connected to the upper bracket, said upper strap portion including a free end, and wherein said means for attaching the curtain to the lower bracket is comprised of a lower strap portion extending from the lower portion of the web and being connected to the lower bracket, said lower strap portion including a free end; and
   vertical tensioning means for applying vertical tension to said upper and lower brackets, said vertical tensioning means applying tension to the free ends of said straps whereby said brackets and said curtain are vertically tensioned.

2. The van body of claim 1 wherein said web is integrated with said curtain.

3. The van body of claim 1 wherein said upper track further includes an upper rail, said upper rail being located under said upper set of roller means, and said lower track further includes a lower rail, said lower rail being located above said lower set of roller means.

4. The van body of claim 1 wherein said upper strap portion is attached to said upper bracket by an upper bossing means for bossing said upper strap to said upper bracket and by means for connecting said upper bossing means to said upper bracket, and said lower strap portion is attached to said lower bracket by a lower bossing means and by means for connecting said lower bossing means to said lower bracket.

5. The van body of claim 1 wherein said means for applying tension to the free ends of said straps comprises a buckle.

6. The van body of claim 1, and further comprising biasing means for at least one of said brackets.

7. The van body of claim 6 wherein said biasing means for at least one of said brackets comprises:
   a bolting means inserted in each of said at least one brackets; and
   a spring means surrounding each of said bolting means.

8. The vertical tensioning means of claim 1 and further comprising a pocket means for said web and said straps, said pocket means being attached to said curtained door and being located between said upper bracket and said lower bracket.

9. A van body comprising:
   a curtain;
   at least one end plate located at an end of said curtain;
   means for attaching said curtain to said at least one end plate; and
   at least one latching means for holding said curtain against a vehicle body, said latching means including a camming means, said camming means being engageable and disengageable with said end plate, whereby horizontal tensioning is applied to said curtain by engaging said camming means with said end plate.

10. The van body of claim 9 wherein said attaching means comprises:
    a half round, said half round being adjacent to said curtain door for the entire length of the arc of said half round; and
    means for mounting said half round and said curtain against said end plate, thereby bossing said curtain against said end plate.

11. The van body of claim 9 wherein said latching means further comprises:
    a handle;
    means for detachably securing said handle to said end plate;
    a first pivot for pivotally attaching said camming means to said handle, said camming means being engageable and disengageable with said end plate, and said camming means also being rotatable about a second pivot;
    at least one hinge bar, said at least one hinge bar being located adjacent one end of said camming means, and also being rotatable about said second pivot; and
    at least one hinge butt means, said at least one hinge butt means being attached to said vehicle body and attached to at least one of said hinge bars by a third pivot.

12. The van body of claim 11 wherein said handle comprises a first portion and a second portion, said first portion being pivotally connected to said second portion by a fourth pivot and rotatable by 180° about said fourth pivot.

13. The van body of claim 12 wherein said second portion of said handle is detachably connected to said end plate.

14. The van body of claim 11 wherein said hinge butt is slidably attached to said vehicle body by at least one mounting means inserted into at least one elongated opening in said hinge butt means, said at least one elongated opening having a width greater than the diameter of said mounting means, and a height substantially the same as the diameter of said mounting means.

15. The van body of claim 9 wherein said camming means is of substantially the same height as the height of said end plate.

16. A van body comprising:
   a curtain;
   an upper track opposite the top of said van body;
   an upper set of roller means rollably fitted in said upper track;
   a lower track opposite the bottom of said van body;
   a lower set of roller means rollably fitted in said lower track;
   an upper bracket means attached to said upper set of roller means;
   a lower bracket means attached to said lower set of roller means;
   a first means for attaching said curtain to said upper bracket means;
   a second means for attaching said curtain to said lower bracket means;
   vertical tensioning means for applying vertical tension to said upper and lower brackets;
   at least one end plate located at an end of said curtain;
   means for attaching said curtain to said at least one end plate; and
   at least one latching means for holding said curtain against a vehicle body, said latching means including a camming means, said camming means being engageable and disengageable with said end plate, whereby horizontal tensioning is applied to said curtain by engaging said camming means with said end plate.

17. The van body of claim 16 wherein said curtain includes a plurality of spaced vertical reinforcing webs, said curtain being connected to the upper bracket means at said reinforcing web and said curtain being connected to the lower bracket means at said reinforcing web, and wherein said means for attaching the curtain to the upper bracket means is comprised of an upper strap portion extending from the upper portion of the web and being connected to the upper bracket, said upper strap portion including a free end, and wherein said means for attaching the curtain to the lower bracket is comprised of a lower strap portion extending from the lower portion of the web and being connected to the lower bracket, said lower strap portion including a free end; and
   said vertical tensioning means applying tension to the free end of said straps whereby said brackets and said curtain are vertically tensionsed.

18. A van body comprising:
   a curtain;
   an upper track opposite the top of said van body;
   an upper set of roller means rollably fitted in said upper track;
   a lower track opposite the bottom of said van body;
   a lower set of roller means rollably fitted in said lower track;
   an upper bracket means attached to said upper set of roller means;
   a lower bracket means attached to said lower set of roller means;
   vertical tension means for applying vertical tension to said upper and lower brackets, wherein said curtain includes a plurality of spaced vertical reinforcing webs, said curtain being connected to the upper bracket means at said reinforcing web and said curtain being connected to the lower bracket means at said reinforcing web, and wherein said means for attaching the curtain to the upper bracket means is comprised of an upper strap portion extending from the upper portion of the web and being connected to the upper bracket, said upper strap portion including a free end, and wherein said means for attaching the curtain to the lower bracket means is comprised of a lower strap portion extending from the lower portion of the web and being connected to the lower bracket means, said lower strap portion including a free end, and said vertical tensioning means applying tension to the free end of said straps whereby said brackets and said curtain are vertically tensioned.

* * * * *